No. 709,396. Patented Sept. 16, 1902.
F. CORSSEN.
SPRING SUSPENSION FOR VEHICLE BODIES.
(Application filed Mar. 12, 1902.)
(No Model.) 2 Sheets—Sheet 1.
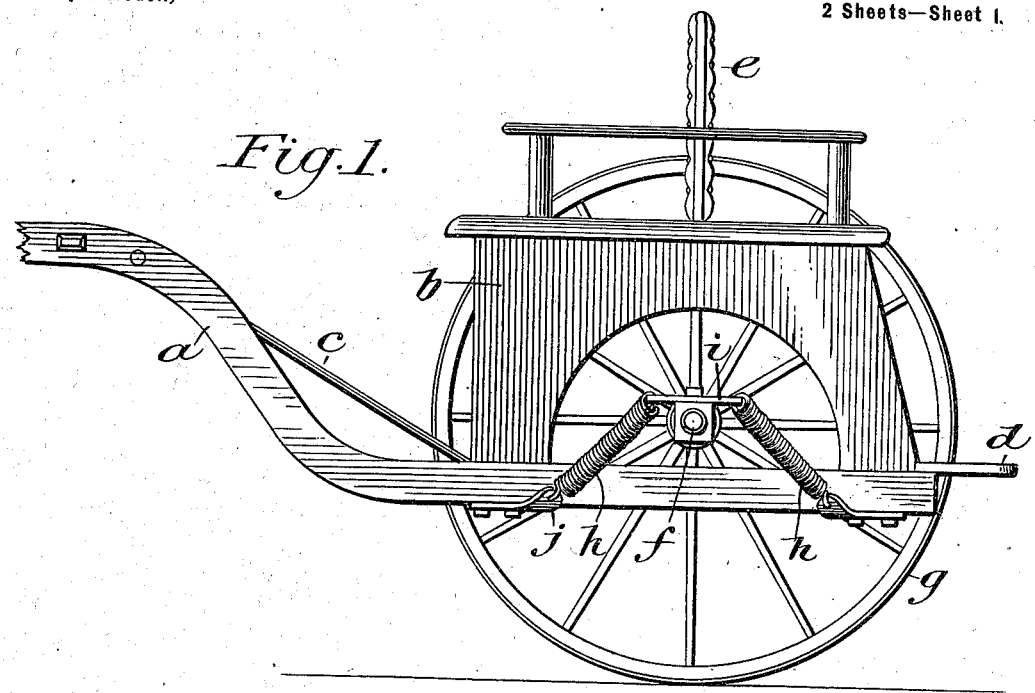
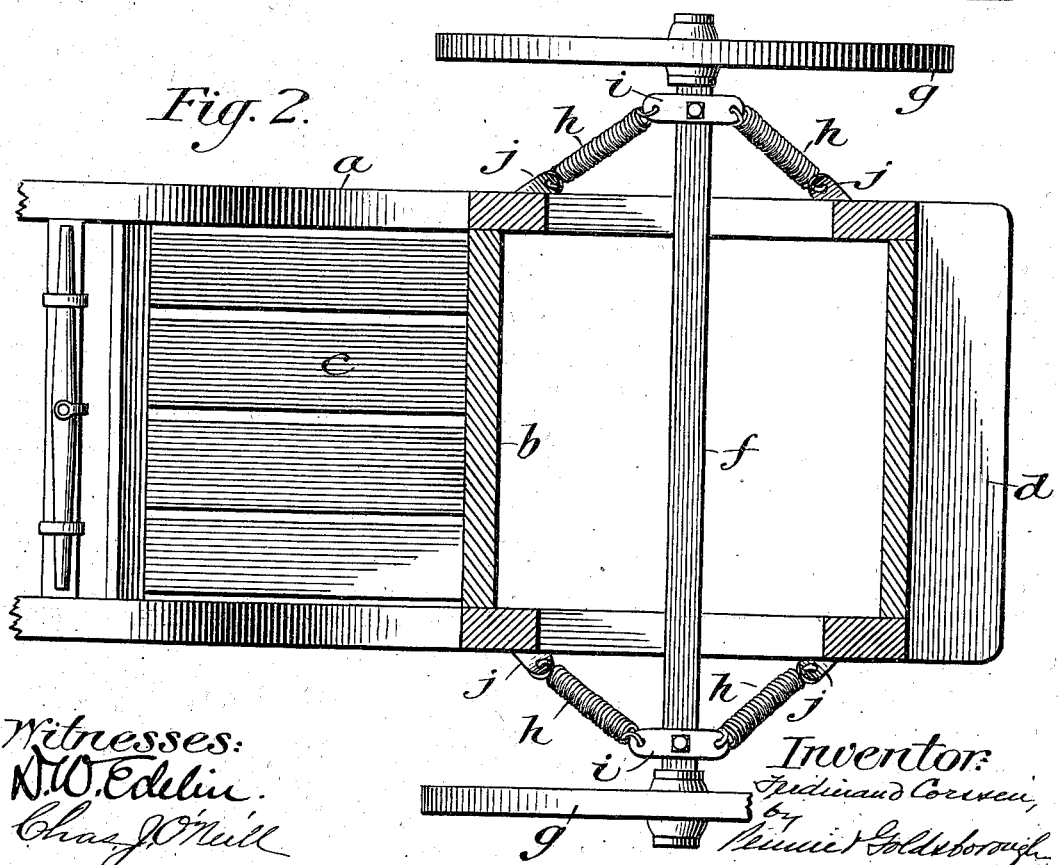

No. 709,396. Patented Sept. 16, 1902.
F. CORSSEN.
SPRING SUSPENSION FOR VEHICLE BODIES.
(Application filed Mar. 12, 1902.)
(No Model.)
2 Sheets—Sheet 2.

Witnesses:
D. W. Edelin.
Chas. J. O'Neill

Inventor:
Ferdinand Corssen,
by Semmes & Goldsborough,
Attys.

UNITED STATES PATENT OFFICE.

FERDINAND CORSSEN, OF RITTERGUT SAARMUND, NEAR POTSDAM, GERMANY, ASSIGNOR OF ONE-HALF TO EDWARD F. WILKENS, OF HAYMARKET, VIRGINIA.

SPRING SUSPENSION FOR VEHICLE-BODIES.

SPECIFICATION forming part of Letters Patent No. 709,396, dated September 16, 1902.

Application filed March 12, 1902. Serial No. 97,939. (No model.)

*To all whom it may concern:*

Be it known that I, FERDINAND CORSSEN, a German subject, residing at Rittergut Saarmund, near Potsdam, Germany, have invented certain new and useful Improvements in Spring Suspension for Vehicle-Bodies; and I do hereby declare the following to be a full, clear, and exact description of the invention, such as will enable others skilled in the art to which it appertains to make and use the same.

The object of my invention is to so suspend the body portion of a vehicle from the axle or axles thereof that jolts and jars imparted to the vehicle-wheels upon encountering stones, roots, or like obstacles or when traveling over heavy ground will be transmitted to said body portion and its occupants only through the medium of compensating springs of such a disposition and arrangement as to respond to and modify the shock from whatever point it manifests itself.

It is a distinguishing characteristic of my invention over anything known to me in the prior state of the art that its running-gear (*i. e.*, the wheels and their axle or axles) is connected to the vehicle-body and its shafts or tongue through the intermediacy of springs within which the body is suspended to swing freely and which also serve as the draft connection to the running-gear, so that whatever irregularity of motion (vertical, transverse, or otherwise) may be imparted to the running-gear by reason of a rough or uneven road-bed it will be correspondingly modified in its effect upon the vehicle-body and its occupants and upon the draft-animal.

Figure 3:
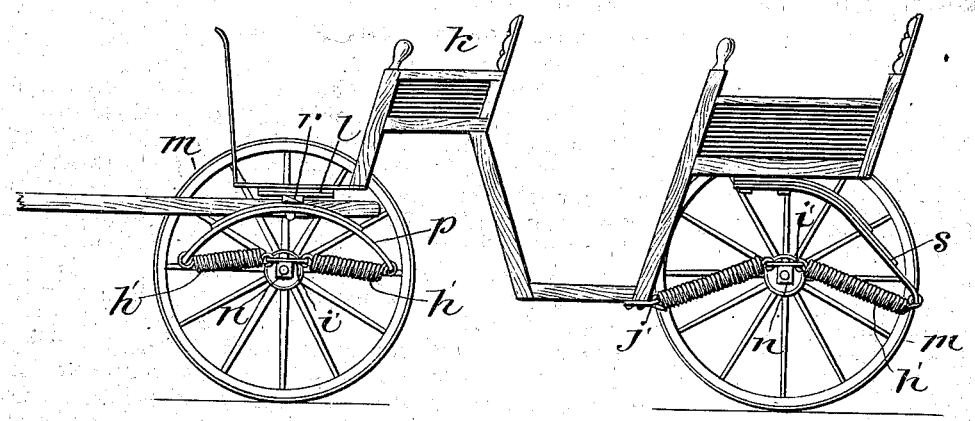
Figure 4:
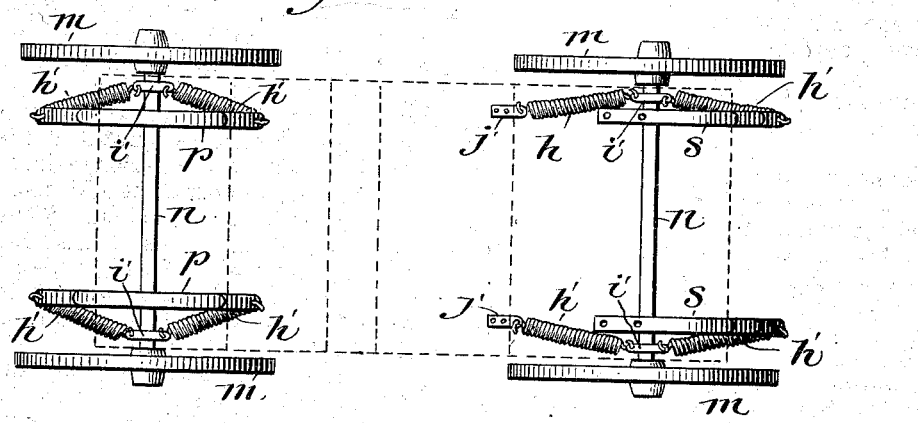

In the accompanying drawings, Figure 1 represents in side elevation a two-wheeled wagon or cart embodying my invention. Fig. 2 represents a plan view thereof, partly in section. Fig. 3 represents in side elevation a four-wheeled wagon, also embodying my invention. Fig. 4 represents a plan view thereof, with the body portion indicated in dotted lines only.

Similar letters of reference indicate similar parts throughout the several views.

Referring to Figs. 1 and 2, $a$ indicates the shafts of the cart prolonged to constitute a support for the box $b$. The latter may, as shown, conveniently be provided with the customary front platform $c$, rear platform $d$, and double-cushioned back $e$, separating the front and rear seats, as is usual in tilburys, although, as will be readily understood, the particular construction of the box is not of the essence of my invention.

From opposite ends of the non-rotating axle $f$, upon which the wheels $g$ turn freely, extend the spirally-wound tension-springs $h$, the tension of said springs being sufficient to retain the convolutions substantially closed under ordinary conditions of load and when the vehicle is at rest, but not to interfere with their desired compensating and cushioning action during travel.

The springs may be connected in any suitable manner to the axle—for instance, by hooking their end convolutions into openings into a metallic plate $i$, rigidly secured to the axle. From the plate they extend downwardly and inwardly in a diagonal direction to the body portion and may be attached thereto by being hooked into holes in the metal plates $j$, bolted to the prolongations of the shafts. In this connection it will also be noted that by this mode of suspension the body portion sets well down over the axle, thereby lowering the center of gravity, and consequently lessening the danger of overturning and increasing the feeling of security of the occupants.

The chief merit of the invention, however, consists in the fact, which will now be plainly apparent, that instead of manifesting their compensating action in a vertical direction only (as the case with the ordinary carrying-springs) these springs of mine act in all directions. This is of especial importance with respect to side jolts, whose tendency to throw the occupant out of the cart or give him an unpleasant shock is instantly counteracted by a compensating movement of the entire body portion braked by the system of springs. Moreover, in ordinary travel over good roads the movement is materially smoother and the wear and tear upon both vehicle and horse are considerably lessened.

In the cart shown in Figs. 1 and 2 I have shown the spiral tension-springs as connected directly to the body portion of the vehicle, a construction which I prefer in that instance. Where a four-wheeled vehicle is employed, however, I prefer to connect the spiral tension-springs indirectly to the body portion—for instance, through the intermediacy of the usual bow-springs or leaf-springs—this being but another modification or embodiment of the generic or characteristic feature of my invention. Thus in Figs. 3 and 4 the two-seated box $k$, connected to the shafts by a fifth-wheel $l$ and having the wheels $m$ and non-rotary axles $n$, is provided with the spiral tension-springs $h'$, connected at one end to the metal plates $i'$, bolted to the axles. The forward sets of spiral springs are connected to the body portion through the intermediacy of the bow-springs $p$, which support the transverse bar $r$, carrying the fifth-wheel. So, also, the rear sets of spiral springs are connected to the body portion through the intermediacy of the leaf-springs $s$ and the plates $j'$.

Having thus described my invention, what I claim is—

1. In a wheeled vehicle, a spring suspension for the body portion thereof, consisting of spiral tension-springs connected at one end to the axle, the opposite ends of said springs being connected to the body portion, said spring suspension serving also as the draft connection to the axle; substantially as described.

2. In a wheeled vehicle, a spring suspension for the body portion thereof, consisting of spiral tension-springs, connected at one end to the axle and extending thence inwardly, the opposite ends being connected to the body portion, said spring suspension serving also as the draft connection to the axle; substantially as described.

3. In a wheeled vehicle, a spring suspension for the body portion thereof, consisting of spiral tension-springs connected at one end to the axle and extending thence inwardly and downwardly, the opposite ends being connected to the body portion, said spring suspension serving also as the draft connection to the axle; substantially as described.

4. In a wheeled vehicle, a spring suspension for the body portion thereof, consisting of spiral tension-springs connected at one end to the axle and extending thence inwardly and downwardly, the opposite ends being connected to the body portion through the intermediacy of auxiliary leaf-springs, said spring suspension serving also as the draft connection to the axle; substantially as described.

5. In a wheeled vehicle, a spring suspension for the body portion thereof, consisting of spiral tension-springs, plates on the axle with which one end of the springs engages, said springs extending diagonally downward and inward and being connected at their opposite ends to the body portion, said spring suspension serving also as the draft connection to the axle; substantially as described.

6. In a wheeled vehicle, a spring suspension for the body portion thereof, consisting of a pair of spiral tension-springs at each axle end, the members of each pair extending oppositely in diagonal, downward and inward directions to connections with the body portion, said spring suspension serving also as the draft connection to the axle; substantially as described.

In testimony whereof I affix my signature in presence of two witnesses.

FERDINAND CORSSEN.

Witnesses:
HENRY HASPER,
WOLDEMAR HAUPT.